(12) United States Patent
Casati et al.

(10) Patent No.: US 11,943,673 B2
(45) Date of Patent: Mar. 26, 2024

(54) METHOD AND APPARATUS FOR TRACKING AREA TOPOLOGY

(71) Applicant: NOKIA TECHNOLOGIES OY, Espoo (FI)

(72) Inventors: Alessio Casati, West Molesey (GB); Laurent Thiebaut, Antony (FR); Philippe Godin, Versailles (FR); Georgios Gkellas, Petroupoli (GR)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/237,680

(22) Filed: Apr. 22, 2021

(65) Prior Publication Data

US 2022/0345963 A1 Oct. 27, 2022

(51) Int. Cl.
*H04W 36/00* (2009.01)

(52) U.S. Cl.
CPC . *H04W 36/00835* (2018.08); *H04W 36/0061* (2013.01)

(58) Field of Classification Search
None
See application file for complete search history.

(56) References Cited

U.S. PATENT DOCUMENTS

| | | | | |
|---|---|---|---|---|
| 2013/0150039 A1* | 6/2013 | Ramle | ................... | H04W 8/18 455/436 |
| 2014/0044058 A1* | 2/2014 | El-saidny | .............. | H04W 72/51 370/329 |
| 2019/0159117 A1* | 5/2019 | Kuge | ...................... | H04W 8/08 |
| 2020/0128507 A1* | 4/2020 | Ryu | ....................... | H04W 60/04 |
| 2020/0178204 A1* | 6/2020 | Chen | ..................... | H04W 60/00 |
| 2021/0037496 A1* | 2/2021 | Ryu | ........................ | H04W 8/02 |
| 2021/0105693 A1* | 4/2021 | Tripathi | ................ | H04W 36/30 |
| 2022/0124662 A1* | 4/2022 | Meng | .................... | H04W 60/00 |

FOREIGN PATENT DOCUMENTS

JP 2020/530242 A 10/2020

OTHER PUBLICATIONS

"3rd Generation Partnership Project; Technical Specification Group Services and System Aspects; General Packet Radio Service (GPRS) enhancements for Evolved Universal Terrestrial Radio Access Network (E-UTRAN) access (Release 17)", 3GPP TS 23.401 v17.0.0, (Mar. 30, 2021), 442 pages.

"3rd Generation Partnership Project; Technical Specification Group Radio Access Network; NG-RAN; NG Application Protocol (NGAP) (Release 16)", 3GPP TS 38.413 v16.5.0, (Apr. 9, 2021), 473 pages.

Extended European Search Report for European Application No. 22169070.4 dated Sep. 13, 2022, 8 pages.

* cited by examiner

*Primary Examiner* — Hashim S Bhatti

(74) *Attorney, Agent, or Firm* — ALSTON & BIRD LLP

(57) ABSTRACT

Techniques for determining a registration area are provided. A network entity may receive one or more indications of topology information from one or more radio access network nodes. Each indication of topology information is related to one or more tracking areas and each tracking area is associated with one or more cells in a radio access network served by each of the one or more radio access network nodes. The network entity may determine a registration area based at least in part on the received one or more indications of topology information related to the one or more tracking areas.

19 Claims, 8 Drawing Sheets

300

500

700

RECEIVE ONE OR MORE INDICATIONS OF TOPOLOGY INFORMATION RELATED TO ONE OR MORE TRACKING AREAS
701

DETERMINE A REGISTRATION AREA BASED AT LEAST IN PART ON THE RECEIVED INDICATION OF THE ONE OR MORE TRACKING AREAS ASSOCIATED WITH THE ONE OR MORE RADIO ACCESS NETWORK ENTITIES
702

800

CAUSING THE TRANSMISSION OF ONE OR MORE INDICATIONS OF ONE OR MORE TRACKING AREAS TO A MOBILITY MANAGEMENT FUNCTION
801

CAUSING THE MOBILITY MANAGEMENT FUNCTION TO DETERMINE A REGISTRATION AREA BASED AT LEAST IN PART ON THE TRANSMITTED INDICATION OF THE ONE OR MORE TRACKING AREAS
802

METHOD AND APPARATUS FOR TRACKING AREA TOPOLOGY

TECHNOLOGICAL FIELD

An example embodiment relates generally to wireless communications and, more particularly, but not exclusively, to tracking area topology within such systems.

BACKGROUND

Fourth generation (4G) wireless mobile telecommunications technology, also known as Long Term Evolution (LTE) technology, was designed to provide high capacity mobile multimedia with high data rates particularly for human interaction. Next generation or fifth generation (5G) technology is intended to be used not only for human interaction, but also for machine type communications in so-called Internet of Things (IoT) networks.

Such mobile communication networks may be divided into different service areas according to tracking area codes (TAC). A network may page a user equipment by sending a paging message in a tracking area (TA) or registration area (RA) consisting of one or more TAs. A paging message is sent for paging to an individual TA (or TAs of an RA), and the paging message for multiple user devices is sent to multiple radio access network nodes within the TA(s).

BRIEF SUMMARY

A method, apparatus, and computer program product are disclosed for determining a registration area. In this regard, the method, apparatus and computer program product are configured to determine the registration area based at least in part on tracking area topology from an indication of one or more tracking areas. The indication of one or more tracking areas may provide an indication of the overall topology of one or more tracking areas such that a network entity may determine a sensible list of tracking areas for a registration area.

In an example embodiment, a method is provided that includes receiving one or more indications of topology information from one or more radio access network nodes. Each indication of topology information is related to one or more tracking areas. The method also includes determining a registration area for a user equipment based at least in part on the one or more received indications of topology information related to the one or more tracking areas.

In some example embodiments of such a method, each tracking area is associated with one or more cells in a radio access network served by each of the one or more radio access network nodes.

In some example embodiments of such a method, the one or more indications of topology information related to the one or more tracking areas comprises a geographic coverage area of each of the one or more tracking areas and a count of the cells associated with each of the one or more tracking areas for each of the one or more radio access network nodes.

In some example embodiments of such a method, receiving the one or more indications of topology information related to the one or more tracking areas comprises receiving a setup request message or a configuration update message including the one or more indications of topology information for each tracking area served by each of the one or more radio access network nodes.

In some example embodiments of such a method, the one or more indications of topology information related to the one or more tracking areas comprise one or more geographic coordinates providing the center location of the one or more cells and a radius of the one or more cells associated with each of the one or more tracking areas.

In some example embodiments of such a method, the one or more indications of topology information related to the one or more tracking areas comprise one or more geographic coordinates providing the center location of the one or more tracking areas and a radius of the one or more tracking areas.

In some example embodiments of such a method, the one or more indications of topology information related to the one or more tracking areas comprise receiving an uplink non-access stratum transport message. In some embodiments, the one or more indications of topology information is related to the tracking area where a user equipment is located. In some embodiments, the uplink non-access stratum transport message comprises a tracking area identifier and radio access network cell global identifier of the cell where the user equipment is located.

In some example embodiments of such a method, the one or more indications of topology information include one or more identifiers of one or more tracking areas adjacent to each of the one or more tracking areas.

In some example embodiments of such a method, receiving the one or more indications of topology information related to the one or more tracking areas comprises receiving a handover required message or a path switch request of an handover process for a user equipment, including at least one of an identity of a source cell or an identity of a source tracking area of the handover process. In some example embodiments of such a method, receiving the one or more indications of topology information related to the one or more tracking areas comprises receiving a handover required message or a path switch request of an handover process for a user equipment, including an indication of topology information related to a tracking area of a source cell of the handover process. In some example embodiments of such a method the one or more indications of topology information provided by the handover required message or path switch request identifies one or more tracking areas adjacent to the tracking area of the source cell. In some example embodiments of such a method, the method further includes generating a historical log for a user equipment accessing the one or more radio access network entities. The historical log comprises one or more registration procedures performed by the user equipment with the one or more radio access network entities. The registration area is determined based at least in part on any received topology information and the historical log for the user equipment.

In some example embodiments of such a method, receiving the one or more indications of topology information related to the one or more tracking areas comprises receiving a handover notify message or a path switch request of an handover process for a user equipment, including an indication of topology information related to a tracking area of a target cell of the handover process.

In an example embodiment, an apparatus is provided including at least one processor and at least one memory including computer program code with the at least one memory and the computer program code configured to, with the at least one processor, cause the apparatus at least to receive one or more indications of topology information from one or more radio access network nodes. Each indication of topology information is related to one or more tracking areas. The at least one memory and the computer program code are further configured to determine a registration area for a user equipment based at least in part on the one or more received indications of topology information related to the one or more tracking areas.

In some example embodiments of such an apparatus, each tracking area is associated with one or more cells in a radio access network served by each of the one or more radio access network nodes.

In some example embodiments of such an apparatus, the one or more indications of topology information related to the one or more tracking areas comprises a geographic coverage area of each of the one or more tracking areas and a count of the cells associated with each of the one or more tracking areas for each of the one or more radio access network nodes.

In some example embodiments of such an apparatus, receiving the one or more indications of topology information related to the one or more tracking areas comprises receiving a setup request message or a configuration update message including the one or more indications of topology information for each tracking area served by each of the one or more radio access network nodes.

In some example embodiments of such an apparatus, the one or more indications of topology information related to the one or more tracking areas comprise one or more geographic coordinates providing the center location of the one or more cells and a radius of the one or more cells associated with each of the one or more tracking areas.

In some example embodiments of such an apparatus, the one or more indications of topology information related to the one or more tracking areas comprise one or more geographic coordinates providing the center location of the one or more tracking areas and a radius of the one or more tracking areas.

In some example embodiments of such an apparatus, the one or more indications of topology information related to the one or more tracking areas comprise receiving an uplink non-access stratum transport message. In some embodiments, the one or more indications of topology information is related to the tracking area where a user equipment is located. In some embodiments, the uplink non-access stratum transport message comprises a tracking area identifier and radio access network cell global identifier of the cell where the user equipment is located.

In some example embodiments of such an apparatus, the one or more indications of topology information include one or more identifiers of one or more tracking areas adjacent to each of the one or more tracking areas.

In some example embodiments of such an apparatus, receiving the one or more indications of topology information related to the one or more tracking areas comprises receiving a handover required message or a path switch request of an handover process for a user equipment, including at least one of an identity of a source cell or an identity of a source tracking area of the handover process. In some example embodiments of such an apparatus, receiving the one or more indications of topology information related to the one or more tracking areas comprises receiving a handover required message or a path switch request of an handover process for a user equipment, including an indication of topology information related to a tracking area of a source cell of the handover process In some example embodiments of such an apparatus the one or more indications of topology information provided by the handover required message or path switch request identifies one or more tracking areas adjacent to the tracking area of the source cell. The apparatus of an example embodiment is caused to generate a historical log for a user equipment accessing the one or more radio access network entities. The historical log comprises one or more registration procedures performed by the user equipment with the one or more radio access network entities. The registration area is determined based at least in part on any received topology information and the historical log for the user equipment.

In some example embodiments of such an apparatus, receiving the one or more indications of topology information related to the one or more tracking areas comprises receiving a handover notify message or a path switch request of an handover process for a user equipment, including an indication of topology information related to a tracking area of a target cell of the handover process.

In an example embodiment, a computer program product is provided that includes at least one non-transitory computer-readable storage medium having computer executable program code instructions stored therein with the computer executable program code instructions including program code instructions configured, upon execution, to receive one or more indications of topology information from one or more radio access network nodes. Each indication of topology information is related to one or more tracking areas. The at least one memory and the computer program code are further configured to determine a registration area for a user equipment based at least in part on the one or more received indications of topology information related to the one or more tracking areas.

In some example embodiments of such a computer program product, each tracking area is associated with one or more cells in a radio access network served by each of the one or more radio access network nodes.

In some example embodiments of such a computer program product, the one or more indications of topology information related to the one or more tracking areas comprises a geographic coverage area of each of the one or more tracking areas and a count of the cells associated with each of the one or more tracking areas for each of the one or more radio access network nodes.

In some example embodiments of such a computer program product, receiving the one or more indications of topology information related to the one or more tracking areas comprises receiving a setup request message or a configuration update message including the one or more indications of topology information for each tracking area served by each of the one or more radio access network nodes.

In some example embodiments of such a computer program product, the one or more indications of topology information related to the one or more tracking areas comprise one or more geographic coordinates providing the center location of the one or more cells and a radius of the one or more cells associated with each of the one or more tracking areas.

In some example embodiments of such a computer program product, the one or more indications of topology information related to the one or more tracking areas comprise one or more geographic coordinates providing the center location of the one or more tracking areas and a radius of the one or more tracking areas.

In some example embodiments of such a computer program product, the one or more indications of topology information related to the one or more tracking areas comprise receiving an uplink non-access stratum transport message. In some embodiments, the one or more indications of topology information is related to the tracking area where a user equipment is located. In some embodiments, the uplink non-access stratum transport message comprises a tracking area identifier and radio access network cell global identifier of the cell where the user equipment is located.

In some example embodiments of such a computer program product, the one or more indications of topology information include one or more identifiers of one or more tracking areas adjacent to each of the one or more tracking areas.

In some example embodiments of such a computer program product, receiving the one or more indications of topology information related to the one or more tracking areas comprises receiving a handover required message or a path switch request of an handover process for a user equipment, including at least one of an identity of a source cell or an identity of a source tracking area of the handover process. In some example embodiments of such a computer program product, receiving the one or more indications of topology information related to the one or more tracking areas comprises receiving a handover required message or a path switch request of an handover process for a user equipment, including an indication of topology information related to a tracking area of a source cell of the handover process In some example embodiments of such a computer program product, the one or more indications of topology information provided by the handover required message or path switch request identifies one or more tracking areas adjacent to the tracking area of the source cell The program code instructions of an example embodiment is configured to generate a historical log for a user equipment accessing the one or more radio access network entities. The historical log comprises one or more registration procedures performed by the user equipment with the one or more radio access network entities. The registration area is determined based at least in part on any received topology information and the historical log for the user equipment.

In some example embodiments of such a computer program product, receiving the one or more indications of topology information related to the one or more tracking areas comprises receiving a handover notify message or a path switch request of an handover process for a user equipment, including an indication of topology information related to a tracking area of a target cell of the handover process.

In a further example embodiment, an apparatus is provided that includes means for receiving one or more indications of topology information from one or more radio access network nodes. Each indication of topology information is related to one or more tracking areas. The apparatus also includes means for determining a registration area for a user equipment based at least in part on the one or more received indications of topology information related to the one or more tracking areas.

In some example embodiments of such an apparatus, each tracking area is associated with one or more cells in a radio access network served by each of the one or more radio access network nodes.

In some example embodiments of such an apparatus, the one or more indications of topology information related to the one or more tracking areas comprises a geographic coverage area of each of the one or more tracking areas and a count of the cells associated with each of the one or more tracking areas for each of the one or more radio access network nodes.

In some example embodiments of such an apparatus, receiving the one or more indications of topology information related to the one or more tracking areas comprises receiving a setup request message or a configuration update message including the one or more indications of topology information for each tracking area served by each of the one or more radio access network nodes.

In some example embodiments of such an apparatus, the one or more indications of topology information related to the one or more tracking areas comprise one or more geographic coordinates providing the center location of the one or more cells and a radius of the one or more cells associated with each of the one or more tracking areas.

In some example embodiments of such an apparatus, the one or more indications of topology information related to the one or more tracking areas comprise one or more geographic coordinates providing the center location of the one or more tracking areas and a radius of the one or more tracking areas.

In some example embodiments of such an apparatus, the one or more indications of topology information related to the one or more tracking areas comprise receiving an uplink non-access stratum transport message. In some embodiments, the one or more indications of topology information is related to the tracking area where a user equipment is located. In some embodiments, the uplink non-access stratum transport message comprises a tracking area identifier and radio access network cell global identifier of the cell where the user equipment is located.

In some example embodiments of such an apparatus, the one or more indications of topology information include one or more identifiers of one or more tracking areas adjacent to each of the one or more tracking areas.

In some example embodiments of such an apparatus, receiving the one or more indications of topology information related to the one or more tracking areas comprises receiving a handover required message or a path switch request of an handover process for a user equipment, including at least one of an identity of a source cell or an identity of a source tracking area of the handover process. In some example embodiments of such an apparatus, receiving the one or more indications of topology information related to the one or more tracking areas comprises receiving a handover required message or a path switch request of an handover process for a user equipment, including an indication of topology information related to a tracking area of a source cell of the handover process. In some example embodiments of such an apparatus the one or more indications of topology information provided by the handover required message or path switch request identifies one or more tracking areas adjacent to the tracking area of the source cell. In some example embodiments of such an apparatus, the apparatus includes means for generating a historical log for a user equipment accessing the one or more radio access network entities. The historical log comprises one or more registration procedures performed by the user equipment with the one or more radio access network entities. The registration area is determined based at least in part on any received topology information and the historical log for the user equipment.

In some example embodiments of such an apparatus, receiving the one or more indications of topology information related to the one or more tracking areas comprises receiving a handover notify message or a path switch request of an handover process for a user equipment, including an indication of topology information related to a tracking area of a target cell of the handover process.

In an example embodiment, a method is provided that includes causing the transmission of one or more indications of topology information to a mobility management function. Each indication of topology information is related to one or more tracking areas. The method also includes causing the mobility management function to generate a registration area based at least in part on the one or more transmitted one or more indications of topology information related to the one or more tracking areas. Each tracking area is associated with one or more cells in a radio access network served by each of the one or more radio access network nodes In some example embodiments of such a method, the one or more indications of topology information related to the one or more tracking areas comprises a geographic coverage area of each of the one or more tracking areas and a count of cells associated with each of the one or more tracking areas.

In some example embodiments of such a method, transmitting the one or more indications of topology information related to the one or more tracking areas comprises transmitting a setup request message or a configuration update message including the one or more indications of topology information related to the one or more tracking areas to the mobility management function.

In some example embodiments of such a method, the one or more indications of topology information related to the one or more tracking areas comprises one or more geographic coordinates providing the center location of one or more cells within the one or more tracking areas and a radius of the one or more cells associated with each of the one or more tracking areas.

In some example embodiments of such a method, the one or more indications of topology information related to the one or more tracking areas comprises one or more geographic coordinates providing the center location of the one or more tracking area and a radius of the one or more tracking areas.

In some example embodiments of such a method, transmitting the one or more indications of topology information related to the one or more tracking areas comprises transmitting an uplink non-access stratum transport message including the indication of the topology information related to the tracking area where a user equipment is located. The indication provided by the uplink non-access stratum transport message comprises a tracking area identifier and radio access network cell global identifier of the cell where the user equipment is located.

In some example embodiments of such a method, the one or more indications of topology information include one or more identifiers of one or more tracking areas adjacent to each of the one or more tracking areas.

In some example embodiments of such a method, transmitting the one or more indications of topology information related to the one or more tracking areas comprises transmitting a handover required message or a path switch request of an handover process for a user equipment, including at least one of an identity of a source cell or an identity of a source tracking area of the handover process. In some example embodiments of such a method, transmitting the one or more indications of topology information related to the one or more tracking areas comprises transmitting a handover required message or a path switch request of an handover process for a user equipment, including an indication of topology information related to a tracking area of a source cell of the handover process. In some embodiments of such a method, the one or more indications of topology information provided by the handover required message or path switch request identifies one or more tracking areas adjacent to the tracking area of the source cell.

In some example embodiments of such a method, transmitting the one or more indications of topology information related to the one or more tracking areas comprises transmitting a handover notify message or a path switch request of an handover process for a user equipment, including an indication of topology information related to a tracking area of a target cell of the handover process.

In an example embodiment, an apparatus is provided including at least one processor and at least one memory including computer program code with the at least one memory and the computer program code configured to, with the at least one processor, cause the apparatus at least to cause the transmission of one or more indications of topology information to a mobility management function. Each indication of topology information is related to one or more tracking areas. The apparatus of an example embodiment may be further configured to cause the mobility management function to generate a registration area based at least in part on the one or more transmitted one or more indications of topology information related to the one or more tracking areas. Each tracking area is associated with one or more cells in a radio access network served by each of the one or more radio access network nodes In some example embodiments of such an apparatus, the one or more indications of topology information related to the one or more tracking areas comprises a geographic coverage area of each of the one or more tracking areas and a count of cells associated with each of the one or more tracking areas.

In some example embodiments of such an apparatus, transmitting the one or more indications of topology information related to the one or more tracking areas comprises transmitting a setup request message or a configuration update message including the one or more indications of topology information related to the one or more tracking areas to the mobility management function.

In some example embodiments of such an apparatus, the one or more indications of topology information related to the one or more tracking areas comprises one or more geographic coordinates providing the center location of one or more cells within the one or more tracking areas and a radius of the one or more cells associated with each of the one or more tracking areas.

In some example embodiments of such an apparatus, the one or more indications of topology information related to the one or more tracking areas comprises one or more geographic coordinates providing the center location of the one or more tracking area and a radius of the one or more tracking areas.

In some example embodiments of such an apparatus, transmitting the one or more indications of topology information related to the one or more tracking areas comprises transmitting an uplink non-access stratum transport message including the indication of the topology information related to the tracking area where a user equipment is located. The indication provided by the uplink non-access stratum transport message comprises a tracking area identifier and radio access network cell global identifier of the cell where the user equipment is located.

In some example embodiments of such an apparatus, the one or more indications of topology information include one or more identifiers of one or more tracking areas adjacent to each of the one or more tracking areas.

In some example embodiments of such an apparatus, transmitting the one or more indications of topology information related to the one or more tracking areas comprises transmitting a handover required message or a path switch request of an handover process for a user equipment, including at least one of an identity of a source cell or an identity of a source tracking area of the handover process. In some example embodiments of such an apparatus, transmitting the one or more indications of topology information related to the one or more tracking areas comprises transmitting a handover required message or a path switch request of an handover process for a user equipment, including an indication of topology information related to a tracking area of a source cell of the handover process. In some embodiments of such an apparatus, the one or more indications of topology information provided by the handover required message or path switch request identifies one or more tracking areas adjacent to the tracking area of the source cell.

In some example embodiments of such an apparatus, transmitting the one or more indications of topology information related to the one or more tracking areas comprises transmitting a handover notify message or a path switch request of an handover process for a user equipment, including an indication of topology information related to a tracking area of a target cell of the handover process.

In an example embodiment, a computer program product is provided that includes at least one non-transitory computer-readable storage medium having computer executable program code instructions stored therein with the computer executable program code instructions including program code instructions configured, upon execution, to cause the transmission of one or more indications of topology information to a mobility management function. Each indication of topology information is related to one or more tracking areas. The computer executable program code instructions also include program code instructions are further configured, upon execution, to cause the mobility management function to generate a registration area based at least in part on the one or more transmitted one or more indications of topology information related to the one or more tracking areas. Each tracking area is associated with one or more cells in a radio access network served by each of the one or more radio access network nodes In some example embodiments of such a computer program product, the one or more indications of topology information related to the one or more tracking areas comprises a geographic coverage area of each of the one or more tracking areas and a count of cells associated with each of the one or more tracking areas.

In some example embodiments of such a computer program product, transmitting the one or more indications of topology information related to the one or more tracking areas comprises transmitting a setup request message or a configuration update message including the one or more indications of topology information related to the one or more tracking areas to the mobility management function.

In some example embodiments of such a computer program product, the one or more indications of topology information related to the one or more tracking areas comprises one or more geographic coordinates providing the center location of one or more cells within the one or more tracking areas and a radius of the one or more cells associated with each of the one or more tracking areas.

In some example embodiments of such a computer program product, the one or more indications of topology information related to the one or more tracking areas comprises one or more geographic coordinates providing the center location of the one or more tracking area and a radius of the one or more tracking areas.

In some example embodiments of such a computer program product, transmitting the one or more indications of topology information related to the one or more tracking areas comprises transmitting an uplink non-access stratum transport message including the indication of the topology information related to the tracking area where a user equipment is located. The indication provided by the uplink non-access stratum transport message comprises a tracking area identifier and radio access network cell global identifier of the cell where the user equipment is located.

In some example embodiments of such a computer program product, the one or more indications of topology information include one or more identifiers of one or more tracking areas adjacent to each of the one or more tracking areas.

In some example embodiments of such a computer program product, transmitting the one or more indications of topology information related to the one or more tracking areas comprises transmitting a handover required message or a path switch request of an handover process for a user equipment, including at least one of an identity of a source cell or an identity of a source tracking area of the handover process. In some example embodiments of such a computer program product, transmitting the one or more indications of topology information related to the one or more tracking areas comprises transmitting a handover required message or a path switch request of an handover process for a user equipment, including an indication of topology information related to a tracking area of a source cell of the handover process. In some embodiments of such a computer program product, the one or more indications of topology information provided by the handover required message or path switch request identifies one or more tracking areas adjacent to the tracking area of the source cell.

In some example embodiments of such a computer program product, transmitting the one or more indications of topology information related to the one or more tracking areas comprises transmitting a handover notify message or a path switch request of an handover process for a user equipment, including an indication of topology information related to a tracking area of a target cell of the handover process.

In a further example embodiment, an apparatus is provided that includes means for causing the transmission of one or more indications of topology information to a mobility management function. Each indication of topology information is related to one or more tracking areas. The apparatus further includes means for causing the mobility management function to generate a registration area based at least in part on the one or more transmitted one or more indications of topology information related to the one or more tracking areas. Each tracking area is associated with one or more cells in a radio access network served by each of the one or more radio access network nodes In some example embodiments of such an apparatus, the one or more indications of topology information related to the one or more tracking areas comprises a geographic coverage area of each of the one or more tracking areas and a count of cells associated with each of the one or more tracking areas.

In some example embodiments of such an apparatus, transmitting the one or more indications of topology information related to the one or more tracking areas comprises transmitting a setup request message or a configuration update message including the one or more indications of topology information related to the one or more tracking areas to the mobility management function.

In some example embodiments of such an apparatus, the one or more indications of topology information related to the one or more tracking areas comprises one or more geographic coordinates providing the center location of one or more cells within the one or more tracking areas and a radius of the one or more cells associated with each of the one or more tracking areas.

In some example embodiments of such an apparatus, the one or more indications of topology information related to the one or more tracking areas comprises one or more geographic coordinates providing the center location of the one or more tracking area and a radius of the one or more tracking areas.

In some example embodiments of such an apparatus, transmitting the one or more indications of topology information related to the one or more tracking areas comprises transmitting an uplink non-access stratum transport message including the indication of the topology information related to the tracking area where a user equipment is located. The indication provided by the uplink non-access stratum transport message comprises a tracking area identifier and radio access network cell global identifier of the cell where the user equipment is located.

In some example embodiments of such an apparatus, the one or more indications of topology information include one or more identifiers of one or more tracking areas adjacent to each of the one or more tracking areas.

In some example embodiments of such an apparatus, transmitting the one or more indications of topology information related to the one or more tracking areas comprises transmitting a handover required message or a path switch request of an handover process for a user equipment, including at least one of an identity of a source cell or an identity of a source tracking area of the handover process. In some example embodiments of such an apparatus, transmitting the one or more indications of topology information related to the one or more tracking areas comprises transmitting a handover required message or a path switch request of an handover process for a user equipment, including an indication of topology information related to a tracking area of a source cell of the handover process. In some example embodiments of such an apparatus, the one or more indications of topology information provided by the handover required message or path switch request identifies one or more tracking areas adjacent to the tracking area of the source cell.

In some example embodiments of such an apparatus, transmitting the one or more indications of topology information related to the one or more tracking areas comprises transmitting a handover notify message or a path switch request of an handover process for a user equipment, including an indication of topology information related to a tracking area of a target cell of the handover process.

BRIEF DESCRIPTION OF THE DRAWINGS

Figure 1:
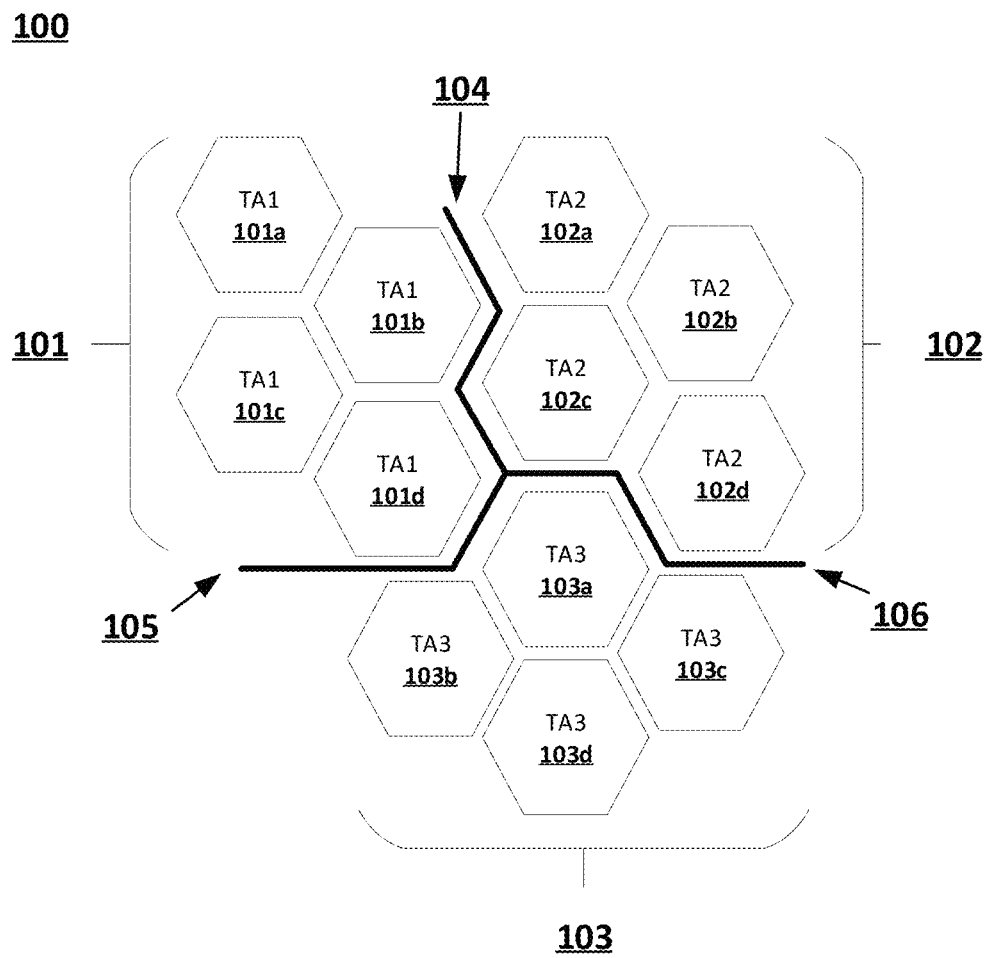
Figure 2:
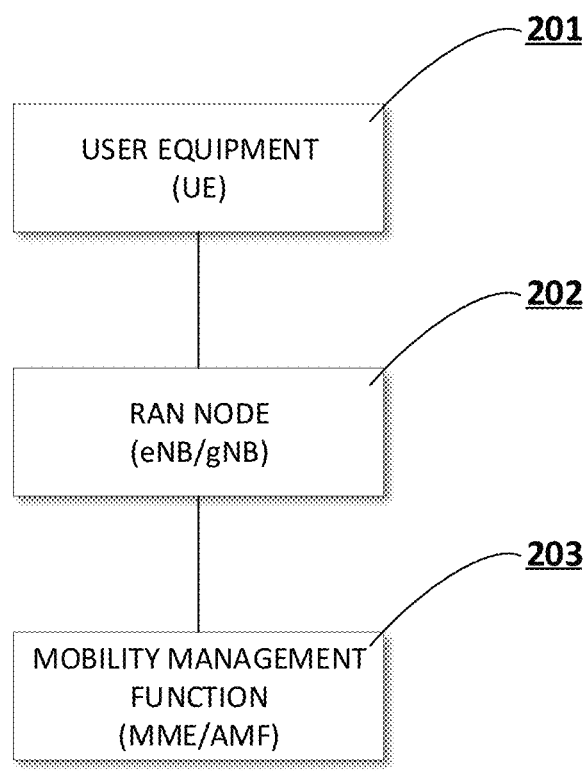
Figure 3:
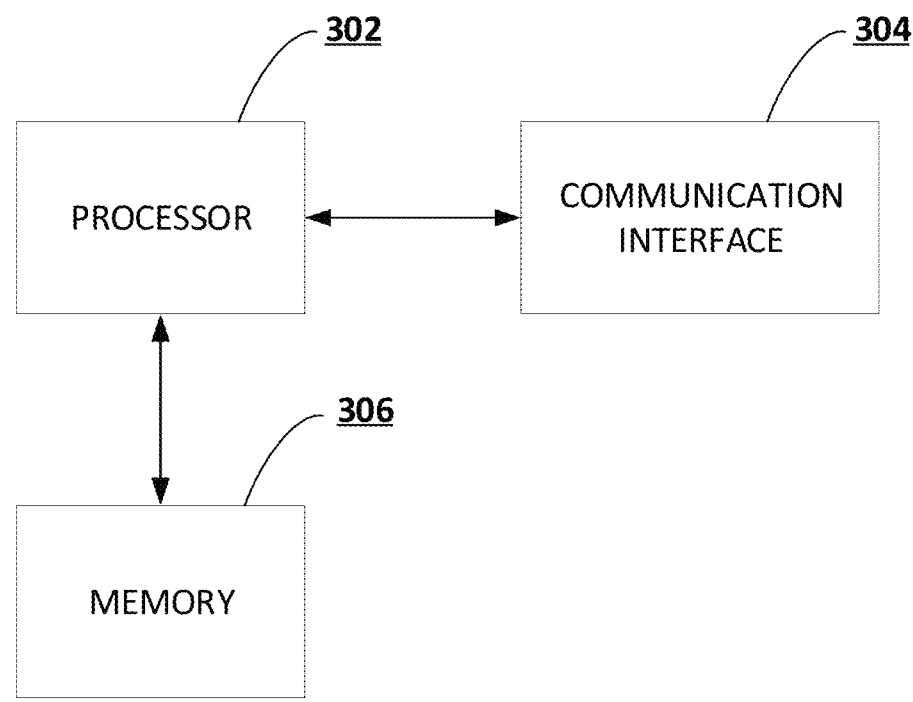
Figure 4A:
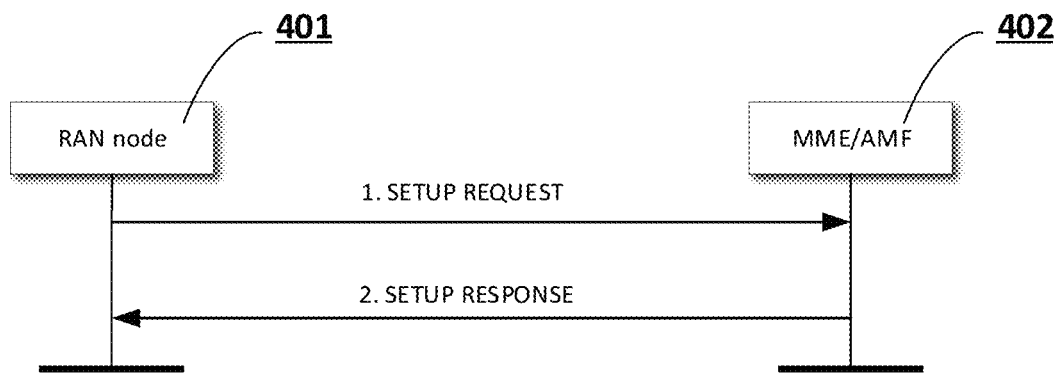
Figure 4B:
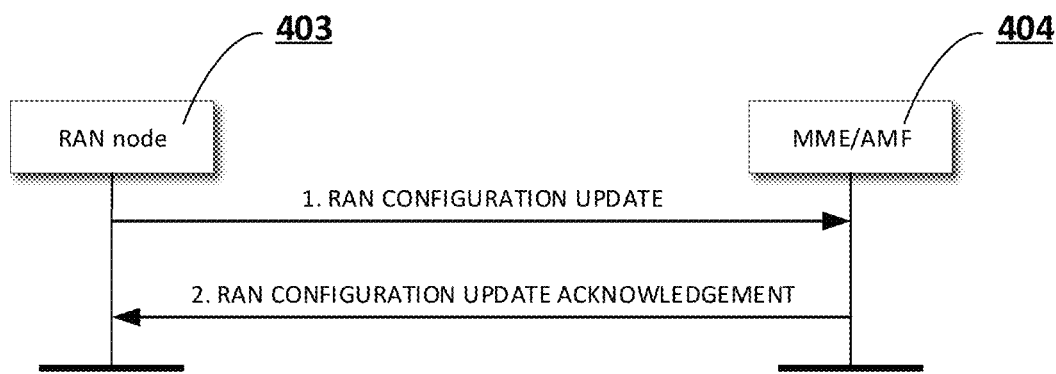
Figure 5:
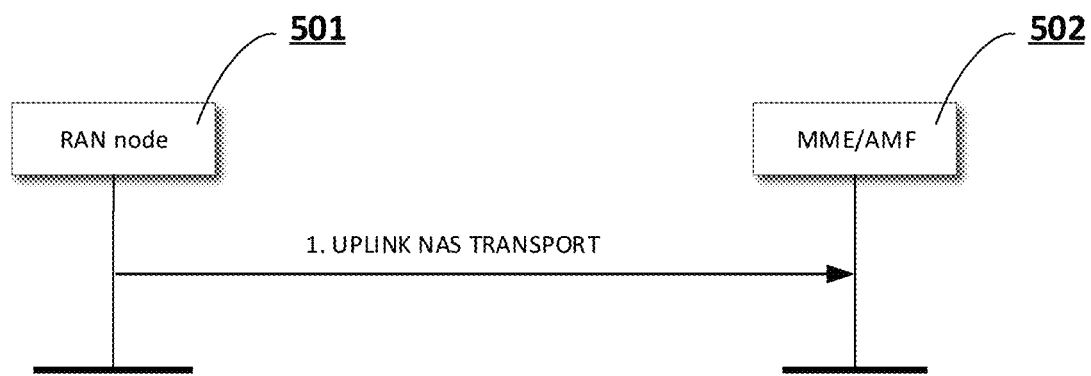
Figure 6A:
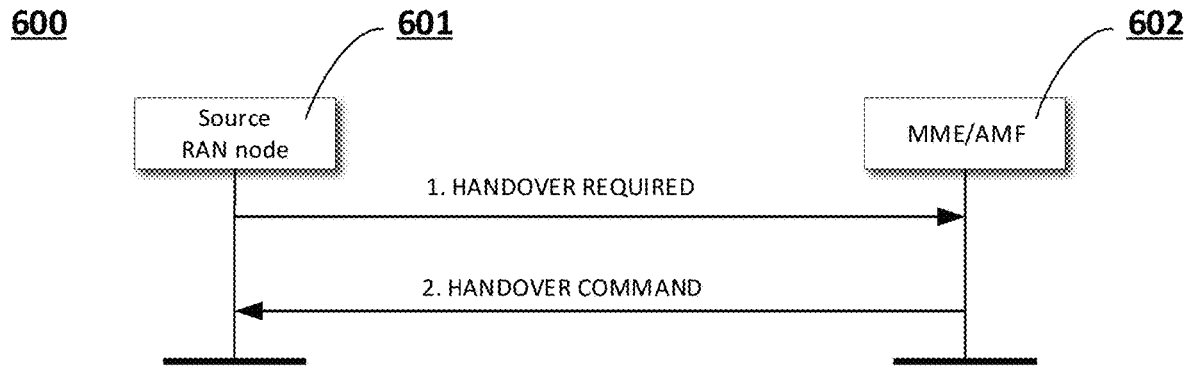
Figure 6B:
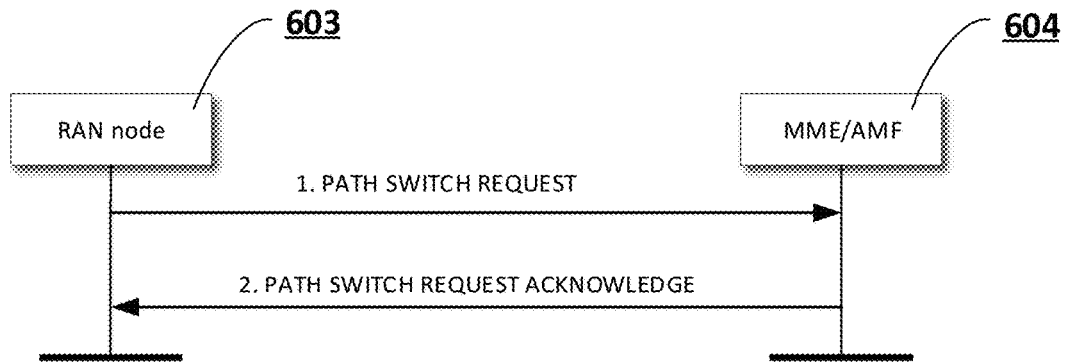
Figure 6C:
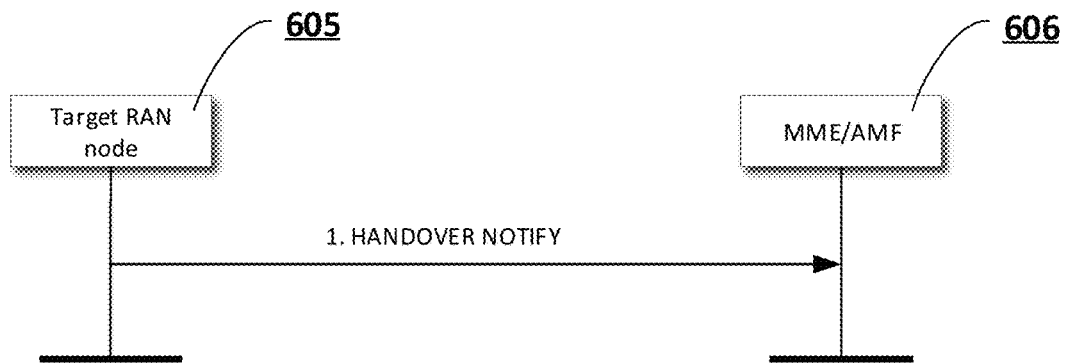
Figure 7:
Figure 8:

Having thus described certain example embodiments of the present disclosure in general terms, reference will hereinafter be made to the accompanying drawings, which are not necessarily drawn to scale, and wherein:

FIG. 1 shows tracking areas in a communication system in an illustrative embodiment;

FIG. 2 shows a communication system in an illustrative embodiment;

FIG. 3 is a block diagram of an apparatus that may be specifically configured in accordance with an example embodiment of the present disclosure;

FIGS. 4A-B show message flows for interface management message procedures in an illustrative embodiment;

FIG. 5 shows a message flow for uplink message procedures in an illustrative embodiment;

FIGS. 6A-C show message flows for handover signaling procedures in an illustrative embodiment;

FIG. 7 illustrates a flow diagram of an embodiment for determining a registration area in an illustrative embodiment; and FIG. 8 illustrates a flow diagram of an embodiment for causing a mobility management entity to determine a registration area in an illustrative embodiment.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device (such as a core network apparatus), field programmable gate array, and/or other computing device.

In both evolved packet systems (EPS) and fifth generation systems (5GS), a mobile communication network may be divided into service areas, known as tracking areas (TAs). The use of individual tracking areas is useful to determine the location of a user equipment (UE) within the communication network. A TA may correspond to a geographic paging area in the communication network. The TA may comprise one or more radio access network (RAN) nodes, such as a next generation NodeB (gNB) or an E-UTRAN Node B (eNB). Each RAN node may be associated with one or more network cells within the TA. Network entities that are part of the EPS and/or 5GS communication network, such as an access and mobility management function (AMF) and/or a mobility management entity (MME), may assign a registration area (RA) comprising one or more TAs. The size of a RA, e.g. the geographic coverage area, may be determined by a variety of factors, such as the paging load within a RA as well as consideration of the frequency of UE signaling due to the UE leaving the RAs. For example, a RA which is too large may result in the paging channel being overloaded while a RA that is too small may result in undesirable, frequent RA update messages. In short, the size of the RA may be a tradeoff between the magnitude of data traffic signaling from the paging channel of the associated one or more TAs comprising the RA as well as mobility management signaling, e.g., the frequency at which the AMF and/or MME need to handle UE signaling due to the UE leaving the RA. Additionally, it may be beneficial for the RA to comprise one or more TAs adjacent to one another such that a UE may remain within the RA as it traverses through one or more TAs.

However, currently network entities, such as the AMF and MME, lack the ability to detect the topology of a deployed TA, unless provided this information through an operation, administration, maintenance (OAM) entity. Without such topology information, it may be difficult for the AMF and/or MME to allocate an RA comprising a sensible list of TAs able to balance UE signaling and paging traffic. Furthermore, in the 5GS communication network, this issue is further exacerbated by an ability to allocate smaller TAs due to the requirement of uniformly supporting a network slice in a TA, such that a smaller TA may be provisioned when the area of service of a network slice is limited to a small number of RAN nodes and/or cells.

Therefore, it may be beneficial to provide network entities, such as an AMF and/or MME, with information such that the AMF and/or MME may build topology awareness and determine a registration area comprising a list of sensible TAs.

FIG. 1 depicts a representation of configurations for a plurality of TAs in a communication network 100 within which illustrative embodiments are to be implemented. However, it is to be appreciated that embodiments are not limited to the network configurations illustrated herein or otherwise described below. It is to be understood that the elements shown in communication system 100 are intended to represent an example embodiment of a TA and/or RA configuration, but any TA and/or RA configuration may be contemplated.

In the configuration depicted in FIG. 1, three TAs 101, 102 and 103 are depicted, comprising cells 101a-d, 102a-d and 103a-d, respectively. In some embodiments, each TA of the plurality of TAs 101, 102 and 103 may correspond to a tracking area identity (TAI), which may uniquely identify the TA from other TAs. The cells 101a-d, 102a-d, and 103a-d are shown as hexagonal, thereby representing a hexagonal geographic coverage area. However, any shape and size may be contemplated. The individual cells of a TA may be associated with a RAN node, such as an eNB or gNB, and may be associated with a geographic coverage area. In some embodiments, each cell of the plurality of TA cells 101a-d, 102a-d and 103a-d maintains distinct geographic coverage areas such that one or more TA cells do not overlap with one another. In some embodiments, two or more TA cells may share the same geographic boundary such that each side of the geographic boundary corresponds to one of the two or more TA cells. In some embodiments, two or more TA cells may be positioned to define a gap between their respective geographic boundaries such that the geographic area within the gap does not correspond to any TA cell. In some embodiments, each TA cell of the plurality of TA cells 101a-d, 102a-d and 103a-d may correspond to an identifier, such as an evolved universal mobile telecommunication system terrestrial radio access network cell global identifier (ECGI), which may uniquely identify the TA cell from other TA cells.

Each TA of the plurality of TAs 101, 102, and 103 may comprise one or more RAN nodes, such as a gNB and/or eNB. These RAN nodes may be positioned anywhere within a TA and may be associated with one or more cells, such as cells 101a-d, 102a-d and/or 103a-d. The number of RAN nodes may differ between TAs, including TAs within the same RA. The RAN nodes may also comprise different RAN node types. For example, TA 101 may comprise three eNBs, TA 102 may comprise two eNBs, and TA 103 may comprise an eNB and a gNB.

In some embodiments, one or more TAs may correspond to a RA. In some embodiments, the RA is assigned by an AMF and/or MME in communication with the one or more RAN nodes within the one or more TAs. In some embodiments, the RA may comprise a list of one or more TAIs uniquely identifying a corresponding TA.

For example, an RA may comprise TA 101 and TA 102, each comprising cells 101a-d and 102a-d, respectively. In some embodiments, a TA border 104 may correspond to the geographic boundary between TA 101 and TA 102. However, the RA may not comprise TA 103 and therefore, may not include cells 103a-d. A TA border 105 may correspond to the geographic boundary between the TA 101 and TA 103 and the TA border 106 may correspond to the geographic boundary between the TA 102 and TA 103.

In an example embodiment, if a UE is registered with a gNB in cell 101d within TA 101 and moves to cell 103b in TA 103, the UE may initiate a tracking area update (TAU) as it is no longer within the RA. However, if the UE is registered with a gNB in TA 101b and moves to TA 102c, the UE may not need to initiate a TAU as the UE remains in RA, moving to a new TA 102.

FIG. 2 shows a communication system 200 within which certain illustrative embodiments are to be implemented. However, it is to be appreciated that embodiments are not limited to the network configurations illustrated herein or otherwise described below. It is to be understood that the elements shown in communication system 200 are intended to represent the main function provided within the system. As such, the blocks shown in FIG. 2 reference specific elements in EPC and 5G networks that provide the main functions. However, other network elements may be used to implement some or all of the main functions represented. Also, it is to be understood that not all functions of an EPC or 5G network are depicted in FIG. 2. Rather, functions that facilitate an explanation of illustrative embodiments are represented.

By way of example, the communication system 200 may be deployed within a radio access architecture. However, the system may be deployed in other applications including within other communication networks including, for example, long term evolution advanced (LTE Advanced, LTE-A), a universal mobile telecommunications system (UMTS) radio access network (UTRAN or E-UTRAN), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof. Any access network eligible to access the 5G core network such as an Un-trusted Non 3GPP access terminated at a Non-3GPP interworking function (N3IWF), a trusted Non-3GPP access terminated at a trusted non-3GPP gateway function (TNGF) or a Wireline access terminated at a wireless access gateway function (W-AGF) may be used instead of the NG RAN/gNB.

In the radio access architecture of FIG. 2, user equipment 201 is configured to be in a wireless connection on one or more communication channels in a cell with an access node, such as an eNB or gNB. The physical link from a user equipment 201 to an eNB or gNB is called the uplink or reverse link and the physical link from the eNB or gNB to the UE is called the downlink or forward link. It should be appreciated that the eNBs, gNBs, or their functionalities may be implemented by using any node, host, server or access point (AP), etc. entity suitable for such a usage.

A communications system typically comprises more than one eNB or gNB, in which case the eNBs or gNBs may also be configured to communicate with one another over links, wired or wireless, designed for the purpose. These links may be used for signaling purposes. The eNB or gNB is a computing device configured to control the radio resources of the communication system to which the eNB or gNB is coupled. The eNB or gNB may also be referred to as a base station, an access point or any other type of interfacing device including a relay station capable of operating in a wireless environment. The eNB or gNB includes or is coupled to transceiver(s). From the transceivers of the eNB or gNB, a connection is provided to an antenna unit that establishes bi-directional radio links to UEs. As such, the transceivers of the eNB or gNB and the transceivers of the UEs may include transmitters and receivers configured to communicate via a channel.

Accordingly, as shown, communication system 200 comprises UE 201 that communicates, such as via an air interface, with an RAN node 202. The UE 201 may be a mobile station, and such a mobile station may comprise, by way of example, a mobile telephone, a computer, or any other type of communication device. In an LTE-V2X implementation, one or more UEs may deployed in a given vehicle. The term "user equipment" as used herein is therefore intended to be construed broadly, so as to encompass a variety of different types of mobile stations, subscriber stations or, more generally, communication devices, including examples such as a combination of a data card inserted in a laptop or other equipment (e.g., a vehicle). The user equipment 201 may also refer to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a UE may also be a nearly exclusive uplink only device, of which an example is a camera or video camera loading images or video clips to a network. A UE may also be a device having the capability to operate in an IoT network, which is a scenario in which objects are provided with the ability to transfer data over a network without requiring human-to-human or human-to-computer interaction. The user equipment (or in some embodiments a layer 3 relay node) is configured to perform one or more of user equipment functionalities. The user equipment may also be called a subscriber unit, mobile station, remote terminal, access terminal, user terminal or user device just to mention but a few names or apparatuses.

In one embodiment, UE 201 is comprised of a Universal Integrated Circuit Card (UICC) and Mobile Equipment (ME). The UICC is the user-dependent part of the UE and contains at least one Universal Subscriber Identity Module (USIM) and appropriate application software. The USIM securely stores the International Mobile Subscriber Identity (IMSI) number and its related key, which are used to identify and authenticate subscribers to access networks. The ME is the user-independent part of the UE and contains terminal equipment (TE) functions and various mobile termination (MT) functions.

The RAN node 202 is illustratively part of a RAN of the communication system 200. In an EPS network, the RAN node is typically implemented by an eNB while in a 5GS network, the RAN node is typically implemented by an gNB. Such an access network may comprise, for example, an EPC or 5GS (or mixed) having a plurality of base stations and one or more associated radio network control functions. The base stations and radio network control functions may be logically separate entities, but in a given embodiment may be implemented in the same physical network element, such as, for example, a base station router or femto cellular access point.

In some example embodiments, the RAN node 202 is operatively coupled to a mobility management function 203, such as via an S1 interface or NG interface. In an EPS network, the function is typically implemented by an MME while in a 5GS network, the function is typically implemented by an AMF. A mobility management function may be an element of function in the core network (CN) part of the communication network 200 that generates, among other network operations, a RA comprising a list of TAIs corresponding to TAs.

One example of an apparatus 300 that may be configured to function as a network entity, such as AMF or MME, is depicted in FIG. 3. As shown in FIG. 3, the apparatus 300 includes, is associated with or is in communication with processing circuitry 302, a memory 306 and a communication interface 304. The processing circuitry 302 may be in communication with the memory device via a bus for passing information among components of the apparatus 300. The memory device 306 may be non-transitory and may include, for example, one or more volatile and/or non-volatile memories. In other words, for example, the memory device 306 may be an electronic storage device (e.g., a computer readable storage medium) comprising gates configured to store data (e.g., bits) that may be retrievable by a machine (e.g., a computing device like the processing circuitry). The memory device 306 may be configured to store information, data, content, applications, instructions, or the like for enabling the apparatus to carry out various functions in accordance with an example embodiment of the present disclosure. For example, the memory device 306 could be configured to buffer input data for processing by the processing circuitry 302. Additionally or alternatively, the memory device 306 could be configured to store instructions for execution by the processing circuitry 302.

The apparatus 300 may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processing circuitry 302 may be embodied in a number of different ways. For example, the processing circuitry 302 may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry may include one or more processing cores configured to perform independently. A multi-core processing circuitry may enable multiprocessing within a single physical package. Additionally or alternatively, the processing circuitry may include one or more processors configured in tandem via the bus to enable independent execution of instructions, pipelining and/or multithreading.

In an example embodiment, the processing circuitry 302 may be configured to execute instructions stored in the memory device 306 or otherwise accessible to the processing circuitry 302. Alternatively or additionally, the processing circuitry may be configured to execute hard coded functionality. As such, whether configured by hardware or software methods, or by a combination thereof, the processing circuitry may represent an entity (e.g., physically embodied in circuitry) capable of performing operations according to an embodiment of the present disclosure while configured accordingly. Thus, for example, when the processing circuitry is embodied as an ASIC, FPGA or the like, the processing circuitry may be specifically configured hardware for conducting the operations described herein. Alternatively, as another example, when the processing circuitry 302 is embodied as an executor of instructions, the instructions may specifically configure the processor to perform the algorithms and/or operations described herein when the instructions are executed. However, in some cases, the processing circuitry 302 may be a processor of a specific device (e.g., an image or video processing system) configured to employ an embodiment of the present invention by further configuration of the processing circuitry by instructions for performing the algorithms and/or operations described herein. The processing circuitry 302 may include, among other things, a clock, an arithmetic logic unit (ALU) and logic gates configured to support operation of the processing circuitry.

The communication interface 304 may be any means such as a device or circuitry embodied in either hardware or a combination of hardware and software that is configured to receive and/or transmit data, including media content in the form of video or image files, one or more audio tracks or the like. In this regard, the communication interface 304 may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

FIGS. 4A-B illustrate interface management messages using a RAN node 401 and MME/AMF 402. Specifically, the interface management message may correspond to a setup request as depicted in FIG. 4A or a RAN configuration update as depicted in FIG. 4B.

In operation 1 of FIG. 4A, the RAN node 401 may establish initial communication with a core network, such as an EPC or 5G core network, by causing the transmission of a setup request message. In some embodiments, the RAN node 401 may comprise an eNB or a gNB. In some embodiments, the setup request message is transmitted via the S1 or NG interface. In some embodiments, the RAN node 401 may be associated with one or more TAs, which may each be identified by a corresponding TAI.

In some embodiments, the setup request message may comprise information describing the geographic coverage area of the TA corresponding to the TA with which the RAN node 401 is associated. In some embodiments, the setup request message may comprise a count of the radio access network nodes within the TA. In some embodiments, the setup request message may further comprise information describing the geographic coverage area and/or a RAN node count of one or more TAs other than the TA corresponding to the RAN node 401, such as one or more adjacent TAs.

In some embodiments, the MME/AMF 402 may receive the setup request message. In some embodiments, the MME/AMF 402 may use the information from the setup request message to determine a RA comprising a list of one or more TAIs.

In operation 2 of FIG. 4A, the MME/AMF 402 may cause the transmission of a setup response message to the RAN node 401. The setup response message may include data indicating the setup request was successful.

In operation 1 of FIG. 4B, the RAN node 403 may update application level configuration data for the RAN node 403 and the MME/AMF 404, by causing the transmission of a RAN configuration update message. The RAN configuration update message does not affect existing UE-related contexts. In some embodiments, the RAN node 403 may comprise an eNB or a gNB. In some embodiments, the RAN configuration update message is transmitted via the S1 or NG interface. In some embodiments, the RAN node 403 may be associated with a one or more TAs, which may each be identified by a corresponding TAI.

In some embodiments, the RAN configuration update message may comprise information describing the geographic coverage area of the TA corresponding to the TA with which the RAN node 403 is associated. In some embodiments, the RAN configuration update message may comprise a count of the radio access network nodes within the TA. In some embodiments, the RAN configuration update message may further comprise information describing the geographic coverage area and/or a RAN node count of one or more TAs other than the TA corresponding to the RAN node 401, such as one or more adjacent TAs.

In some embodiments, the MME/AMF 404 may receive the RAN configuration update message. In some embodiments, the MME/AMF 404 may use the information from the configuration update message to determine a RA comprising a list of one or more TAIs.

In operation 2 of FIG. 4B, the MME/AMF 404 may cause the transmission of a RAN configuration update acknowledgement message to the RAN node 403. In some embodiments, the RAN configuration update acknowledgement message may indicate the configuration data was successfully updated.

FIG. 5 illustrates causing the transmission of and receiving uplink messages using a RAN node 501 and MME/AMF 502. In some embodiments, the uplink message may correspond to an uplink NAS transport message.

In operation 1 of FIG. 5, the RAN node 501 may cause the transmission of the uplink NAS transport message to MME/AMF 502. In some embodiments, the RAN node 501 may comprise an eNB or a gNB. In some embodiments, the uplink NAS transport message is transmitted via the S1 or NG interface. In some embodiments, the RAN node 501 may be associated with one or more TAs, which may be identified by a corresponding TAI.

In some embodiments, the uplink NAS transport message may comprise the geographic coordinates of a predefined portion, such as the center, of the one or more associated TAs and a measure of the size, such as the radius, of the one or more associated TAs. In some embodiments, the uplink NAS transport message may comprise one or more of the geographic coordinates providing the center of the one or more cells comprising the one or more associated TAs and a radius of the one or more cells associated with each of the one or more associated TAs. In some embodiments, the uplink NAS transport message may comprise topology information related to where the UE is located. In some embodiments, the uplink non-access stratum transport message comprises a TAI of the TA and the ECGI of the cell where the UE is located.

In some embodiments, the MME/AMF 502 may receive the uplink NAS transport message. In some embodiments, the MME/AMF 502 may use the information from the uplink NAS transport message to determine a RA comprising a list of one or more TAIs.

FIGS. 6A-C illustrate handover (HO) signal messages using a RAN node 601 and MME/AMF 602. Specifically, the HO signal message may correspond to a handover required message as depicted in FIG. 6A, a path switch request as depicted in FIG. 6B, or as a message indicating a success of an handover such as a handover notify message (defined e.g. in 3GPP TS 36.413 or TS 38.413) as depicted in FIG. 6C.

A UE may be associated with a source RAN node 601 within a TA, such as TA 101 corresponding to a source cell 101d. If the UE moves outside of the TA, such as into cell 103b corresponding to TA 103, the source RAN node 601 may cause the transmission of a handover required message to MME/AMF 602 as shown in operation 1 of FIG. 6A. In some embodiments, the handover required message may comprise the appropriate cause value for the handover. In some embodiments, the handover request message may comprise topology information related to the TA of the source cell 101d of the handover process. For example, the handover request message may comprise the TAI corresponding to the TA 101 with which the source RAN node 601 is associated and an ECGI of the source cell 101d. In some embodiments, the handover request message may identify one or more TAs adjacent to the tracking area of the source cell, such as by their corresponding TAIs.

In some embodiments, the MME/AMF 602 may receive the handover required message. In some embodiments, the MME/AMF 602 may use the information from the setup request message to determine a RA comprising a list of one or more TAIs. In some embodiments, the MME/AMF 602 may determine the most frequent subsequent registrations for a particular UE. In some embodiments, MME/AMF 602 may begin to determine an RA with a single TA and allocating additional TAs. The MME/AMF 602 may add TAs based at least in part on the inference that some TAs are adjacent from the collected history of TA HO signals from a UE.

In operation 2 of FIG. 6A, the MME/AMF 602 may cause the transmission of a handover command message to the source RAN node 601. In some embodiments, the handover command message may include data indicating the reservation of resources at a target RAN node is ready.

FIG. 6B depicts a target RAN node 603 within a TA to which the UE has moved. If the UE moves outside of the TA, such as from TA 101b into TA 102c, the target RAN node 603 corresponding to TA 102c may cause the transmission of a path switch request message to MME/AMF 604 as shown in operation 1 of FIG. 6B. In some embodiments, the path switch request message may comprise the appropriate cause value for the handover. In some embodiments, the path switch request message may comprise the TAI corresponding to the TA with which the target RAN node 603 is associated.

In some embodiments, the MME/AMF 604 may receive the path switch request message. A UE may be associated with a target RAN node 603 within a TA, such as TA 103 corresponding to a target cell 103b. This may have resulted from the UE moving from a source cell 101d associated with TA 101 into target cell 103b. The target RAN node 603 may cause the transmission of a path switch request message to MME/AMF 604 as shown in operation 1 of FIG. 6B. In some embodiments, the path switch request message may comprise the appropriate cause value for the handover. In some embodiments, the path switch request message may comprise topology information related to the TA of the source cell 101d of the handover process and/or topology information related to the TA of the target cell 103d of the handover process. For example, the handover request message may comprise the TAI corresponding to the TA 103 and an ECGI of the source cell 103d, to which the UE has been handed over as well as possibly the TAI corresponding to the TA 101 and an ECGI of the source cell 101d, from which the UE has been handed over. In some embodiments, the handover request message may identify one or more TAs adjacent to the tracking area of the source cell, such as by their corresponding TAIs. In some embodiments, the handover request message may identify one or more TAs adjacent to the tracking area of the target cell, such as by their corresponding TAIs.

In some embodiments, the MME/AMF 604 may use the information from the path switch request message to determine a RA comprising a list of one or more TAIs corresponding to one or more TAs. In some embodiments, the MIME/AMF 604 may determine the most frequent subsequent registrations for a particular UE. In some embodiments, MME/AMF 604 may begin to determine an RA with a single TA and allocating additional TAs. The MME/AMF 604 may add TAs based at least in part on the inference that some TAs are adjacent from the collected history of TA HO signals from a UE.

In operation 2 of FIG. 6B, the MME/AMF 604 may cause the transmission of a path switch request acknowledge message to the RAN node 603. In some embodiments, the path switch request acknowledge message may include data indicating the path switch request was successful.

FIG. 6C depicts a target RAN node 605 within a TA to which the UE has moved. If the UE moves outside of the TA, such as from TA 101b into TA 102c, the target RAN node 605 corresponding to TA 102c may cause the transmission of a handover notify message to MME/AMF 606 as shown in operation 1 of FIG. 6C. In some embodiments, the handover notify message may comprise a notification that a UE has been identified in the target cell and the handover has been successfully completed. In some embodiments, the handover notify message may comprise the topology information of the cell with of a TA. In some embodiments, the handover notify message may comprise the TAI corresponding to the TA with which the target RAN node 605 is associated.

Referring now to FIG. 7, an example flowchart 700 implemented, for example, by an apparatus 300 embodied by a network entity, such as AMF and/or MME 203, to determine a RA will be discussed herein.

As shown in block 701, the apparatus 300 embodied by a network entity, such as MME and/or AMF 203, may include means, such as the processor 302, the communication interface 304 or the like, for receiving one or more indications of topology information related to one or more tracking areas. In some embodiments, each tracking area is associated with one or more cells in the RAN network served by each of the one or more RAN nodes 202. In some embodiments, this indication may be received via a setup request, RAN configuration update, uplink NAS transport, handover request, and/or path switch request as discussed with respect to FIGS. 4-6.

In some embodiments, the one or more indications of topology information may comprise the geographic coverage area of each of the one or more TAs and/or the count of the cells associated with each of the one or more TAs. In some embodiments, the one or more indications of topology information may comprise one or more geographic coordinates providing the center location of the one or more TAs and a radius of the one or more TAs. In some embodiments, the one or more indications of topology information may comprise one or more geographic coordinates providing the center location of the one or more cells and a radius of the one or more cells. In some embodiments, the one or more indications of topology information may comprise topology information related to the TA where a UE is located. In some embodiments, the one or more indications of topology information may comprise a TAI of a corresponding TA and ECGI of the cell where the UE is located. In some embodiments, the indication identifies one or more tracking areas associated with a source cell of a handover process for a UE. In some embodiments, the one or more indications of topology information may comprise one or more TAs adjacent to each of the one or more TAs. In some embodiments, the one or more indications of topology information may comprise one or more TAs adjacent to a source cell of a handover process for a UE.

In some embodiments, the MME and/or AMF 203 may generate a historical log for a UE 201 accessing one or more RAN nodes 202. The historical log may comprise one or more registration procedures performed by the UE 201 with the one or more RAN nodes 202.

As shown in block 702, the apparatus 300 embodied by the network entity, such as MME and/or AMF 203, may include means, such as the processor 302 or the like, for determining a RA based at least in part on the indication of one or more TAs associated with the one or more RAN nodes. As described above, in some embodiments, the RA may comprise a list of one or more TAIs corresponding to one or more TAs. The list of one or more TAIs may include TAs proximately located to one another, such as within a predefined distance of one another, such that the RA comprises a list of sensible TAs. In this way, the MME and/or AMF 302 may determine the list of TAI comprising a RA in a way that is topographically aware.

Referring now to FIG. 8, an example flowchart 800 implemented, for example, by an apparatus 300 embodied by a network entity, such as a RAN node 202, to cause a mobility management function 203 to determine a RA will be discussed herein.

As shown in block 801, the apparatus 300 embodied by a network entity, such as a RAN node 202, may include means, such as the processor 302, the communication interface 304 or the like, for causing the transmission an indication of one or more tracking areas to a mobility management function 203. In some embodiments, this indication may be transmitted via a setup request, RAN configuration update, uplink NAS transport, handover request, and/or path switch request as discussed with respect to FIGS. 4-6.

In some embodiments, the one or more indications of topology information may comprise the geographic coverage area of each of the one or more TAs and/or the count of the cells associated with each of the one or more TAs. In some embodiments, the one or more indications of topology information may comprise one or more geographic coordinates providing a location, such as the center location, of the one or more TAs and a size, such as a radius, of the one or more TAs. In some embodiments, the one or more indications of topology information may comprise one or more geographic coordinates providing the center location of the one or more cells and a radius of the one or more cells. In some embodiments, the one or more indications of topology information may comprise topology information related to the TA where a UE is located. In some embodiments, the one or more indications of topology information may comprise a TAI of a corresponding TA and ECGI of the cell where the UE is located. In some embodiments, the indication identifies one or more tracking areas associated with a source cell of a handover process for a UE. In some embodiments, the one or more indications of topology information may comprise one or more TAs adjacent to each of the one or more TAs. In some embodiments, the one or more indications of topology information may comprise one or more TAs adjacent to a source cell of a handover process for a UE.

As shown in block 802, the apparatus 300 embodied by the network entity, such as RAN node 202, may include means, such as the processor 302 or the like, for causing a mobility management function 203 to determine a RA based at least in part on the indication of one or more TAs. As described above, in some embodiments, the RA may comprise a list of one or more TAIs corresponding to one or more TAs. The list of one or more TAIs may include TAs proximately located to one another, such as within a predefined distance of one another, such that the RA comprises a list of sensible TAs. In this way, the RAN node 202 may provide the mobility management function, such as MME and/or AMF 203, with information required to determine the list of TAI comprising a RA in a way that is topographically aware.

As described above, a method, apparatus, and computer program product are disclosed for determining a RA. In this regard, the method, apparatus and system are configured to determine a RA comprising one or more TAIs corresponding to one or more TAs in a way that is topographically aware. By providing a network entity, such as MME and/or AMF 203 with an an indication of one or more TAs, the network entity, such as MME and/or AMF 203 may more efficiently determine a RA comprising a sensible list of TAIs. In this way, the network entity may more efficiently balance a RA paging load with the frequency of mobility management signaling, thus leading to an overall more efficient communication network.

FIGS. 3-8 illustrate message flows and flow charts depicting methods according to an example embodiment of the present invention. It will be understood that each block of the message flow may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 306 of an apparatus 300 employing an embodiment of the present invention and executed by a processor 302. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts and message flows support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims.

Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

Although a few variations have been described in detail above, other modifications or additions are possible. In particular, further features and/or variations may be provided in addition to those set forth herein. Moreover, the implementations described above may be directed to various combinations and sub-combinations of the disclosed features and/or combinations and sub-combinations of several further features disclosed above. Other embodiments may be within the scope of the following claims.

If desired, the different functions discussed herein may be performed in a different order and/or concurrently with each other. Furthermore, if desired, one or more of the above-described functions may be optional or may be combined. Although various aspects of some of the embodiments are set out in the independent claims, other aspects of some of the embodiments comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of some of the embodiments as defined in the appended claims. Other embodiments may be within the scope of the following claims. The term "based on" includes "based on at least." The use of the phase "such as" means "such as for example" unless otherwise indicated.

It should therefore again be emphasized that the various embodiments described herein are presented by way of illustrative example only and should not be construed as limiting the scope of the claims. For example, alternative embodiments can utilize different communication system configurations, user equipment configurations, base station configurations, identity request processes, messaging protocols and message formats than those described above in the context of the illustrative embodiments. These and numerous other alternative embodiments within the scope of the appended claims will be readily apparent to those skilled in the art.

That which is claimed:

1. A method performed by a mobility management function of a core network, the method comprising:
   receiving topology information related to one or more tracking areas associated with respective radio access network nodes of a plurality of radio access network nodes in a radio access network; and
   determining a registration area for a user equipment based at least in part on the topology information related to the one or more tracking areas associated with respective radio access network nodes of the plurality of radio access network nodes in the radio access network,
   wherein the topology information related to the one or more tracking areas of respective radio access network nodes of the plurality of radio access network nodes comprises at least geographic information regarding the one or more tracking areas and one or more identifiers of one or more tracking areas adjacent to respective tracking areas of the one or more tracking areas.

2. An apparatus for a core network, the apparatus comprising:
   at least one processor; and
   at least one memory storing instructions thereon that, when executed by
   the at least one processor, cause the apparatus at least to perform:

receiving topology information related to one or more tracking areas associated with respective radio access network nodes of a plurality of radio access network nodes in a radio access network; and determining a registration area for a user equipment based at least in part on the topology information related to the one or more tracking areas associated with respective radio access network nodes of the plurality of radio access network nodes in the radio access network, wherein the topology information related to the one or more tracking areas of respective radio access network nodes of the plurality of radio access network nodes comprises at least geographic information regarding the one or more tracking areas and one or more identifiers of one or more tracking areas adjacent to respective tracking areas of the one or more tracking areas.

3. The apparatus of claim 2, wherein respective tracking areas are associated with one or more cells in a radio access network served by respective radio access network nodes of the one or more radio access network nodes.

4. The apparatus of claim 2, wherein the geographic information included in the topology information related to the one or more tracking areas comprises a geographic coverage area of respective tracking areas of the one or more tracking areas and the topology information comprises a count of the cells associated with respective tracking areas of the one or more tracking areas for respective radio access network nodes of the one or more radio access network nodes.

5. The apparatus of claim 2, wherein receiving the topology information related to the one or more tracking areas comprises receiving a setup request message or a configuration update message including the topology information, wherein the topology information comprises topology information for respective tracking areas of the one or more tracking areas served by respective radio access network nodes of the one or more radio access network nodes.

6. The apparatus of claim 2, wherein the geographic information included in the topology information related to the one or more tracking areas comprises one or more geographic coordinates providing the center location of the one or more cells and a radius of the one or more cells within respective tracking areas of the one or more tracking areas of respective radio access network nodes of the plurality of radio access network nodes.

7. The apparatus of claim 2, wherein the geographic information included in the topology information related to the one or more tracking areas comprise one or more geographic coordinates providing the center location of the one or more tracking areas and a radius of the one or more tracking areas of respective radio access network nodes of the plurality of radio access network nodes.

8. The apparatus of claim 2, wherein receiving the topology information related to the one or more tracking areas comprises receiving an uplink non-access stratum transport message comprising the topology information, wherein the topology information is related to the tracking area where a user equipment is located, and wherein the uplink non-access stratum transport message comprising the topology information further comprises a tracking area identifier and a radio access network cell global identifier of the cell where the user equipment is located.

9. The apparatus of claim 2, wherein receiving the topology information related to the one or more tracking areas comprises receiving a handover required message or a path switch request comprising the topology information, the topology information including at least one of an identity of a source cell or an identity of a source tracking area for handover.

10. The apparatus of claim 9, wherein receiving the topology information related to the one or more tracking areas comprises receiving the handover required message or the path switch request comprising the topology information, the topology information being related to the one or more tracking areas, wherein the one or more tracking areas include a tracking area of a source tracking area for handover.

11. The apparatus of claim 9, wherein the topology information included in the handover required message or the path switch request comprises identifiers of one or more tracking areas adjacent to the tracking area of the source cell.

12. The apparatus of claim 9, further comprising:
generating a historical log for a user equipment accessing the one or more radio access network nodes,
wherein the historical log comprises one or more registrations performed by the user equipment with the one or more radio access network nodes, and
wherein the registration area is determined based at least in part on any received topology information and the historical log for the user equipment.

13. The apparatus of claim 2, wherein receiving the topology information related to the one or more tracking areas comprises receiving a handover notify message or a path switch request comprising the topology information, the topology information including topology information related to a tracking area of a target cell for handover.

14. An apparatus fora radio access network node, the apparatus comprising:
at least one processor; and
at least one memory storing instructions thereon that, when executed by
the at least one processor, cause the apparatus at least to perform:
transmitting, to a mobility management function, of topology information related to one or more tracking areas associated with the radio access network node of a radio access network, wherein the topology information related to the one or more tracking areas of respective radio access network nodes of the plurality of radio access network nodes comprises at least geographic information regarding the one or more tracking areas and one or more identifiers of one or more tracking areas adjacent to respective tracking areas of the one or more tracking areas; and
receiving, from the mobility management function, an identifier of a registration area for a user equipment, the identifier of the registration area for the user equipment being generated by the mobility management function based on the topology information.

15. The apparatus of claim 14, wherein the geographic information included in the topology information related to the one or more tracking areas comprises a geographic coverage area of respective tracking areas of the one or more tracking areas and the topology information comprises a count of cells associated with respective tracking areas of the one or more tracking areas.

16. The apparatus of claim 14, wherein transmitting the topology information related to the one or more tracking areas comprises transmitting a setup request message or a configuration update message including the topology information, wherein the topology information comprises topology information related to the one or more tracking areas to the mobility management function.

17. The apparatus of claim 14, wherein the geographic information included in the topology information related to the one or more tracking areas comprises one or more geographic coordinates providing the center location of one or more cells within the one or more tracking areas and a radius of the one or more cells associated with respective tracking areas of the one or more tracking areas.

18. The apparatus of claim 14, wherein the geographic information included in the topology information related to the one or more tracking areas comprises one or more geographic coordinates providing the center location of the one or more tracking area and a radius of the one or more tracking areas.

19. The apparatus of claim 14, wherein transmitting the topology information related to the one or more tracking areas comprises transmitting an uplink non-access stratum transport message comprising the topology information, wherein the topology information is related to the one or more tracking areas, wherein the one or more tracking areas includes the tracking area where a user equipment is located, and wherein the uplink non-access stratum transport message comprising the topology information further comprises a tracking area identifier of the tracking area where the user equipment is located and a radio access network cell global identifier of a cell where the user equipment is located.

* * * * *